Aug. 24, 1965 W. N. VEALE 3,202,516
COATED APPLE PRODUCT
Filed Nov. 7, 1961

INVENTOR
WESTCOTT N. VEALE
BY
Fetherstonhaugh & Co.
ATTORNEYS 3,202,516
COATED APPLE PRODUCT
Westcott N. Veale, Langley, British Columbia, Canada, assignor to Mallet Products Ltd., North Surrey, British Columbia, Canada, a corporation of Canada
Filed Nov. 7, 1961, Ser. No. 150,766
4 Claims. (Cl. 99—138)

This invention relates to an edible product in the form of a fruit or the like covered with an edible coating.

Although this edible product is preferably an apple covered with a candy-type edible coating, it may be the fruit of any plant which has a fairly solid texture, and any desired type of coating may be used. For the sake of convenience, the invention will be described in connection with an apple.

As is well known, candy coated apples have been sold for many years. However, an apple is somewhat difficult to bite into at any time, but when it is covered with a sticky semi-hard candy coating, the problem is magnified. It is very difficult to bite into a candied apple without getting the coating on one's face. Furthermore, despite of the fact that candied apples are usually on a stick, it is also difficult to take the successive bites after the first one.

An object of the present invention is the provision of an edible product, such as an apple, covered with an edible coating, such as a candy coating, which may be easily eaten without getting the coating on to one's face.

Another object is the provision of a coated apple from which pieces may be easily broken to be eaten, and which may be easily bitten into at any time.

Another object is the provision of an edible product comprising an apple or the like having coating material thereon inside the apple as well as over the surface thereof.

With these and other objects in view, an edible product according to the present invention comprises a fruit, such as an apple, of a fairly solid texture cut to form projections on a central core, the exposed surface of the fruit being covered with an edible coating. The coating may be such as to cover the exposed surface, or it may sink into some or all of the surface. In the preferred form of the invention, the fruit is cut to form a plurality of slices on and radiating from a central core. If the pulp or body of the fruit is not too strong, it is preferable to cut it helically to form a plurality of spirally connected slices so that these slices support each other. The fruit is usually dipped in the edible coating, but the latter may be sprayed, painted or otherwise applied to the fruit. With dipping or spraying, the coating material is applied to the fruit right into and over the central core thereof. If it is advisable to furnish the coated fruit with a handle or stick. The handle may be applied in any desired way, but it is usually inserted into the core and projects outwardly therefrom.

An example of this invention is illustrated in the accompanying drawings, in which.

Figure 1:
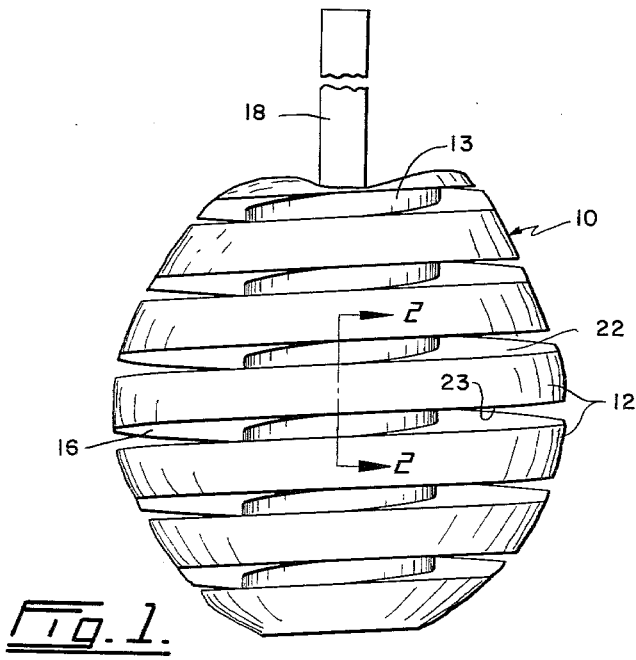
FIGURE 1 is a side elevation of an edible product in the form of an apple.
Figure 2:
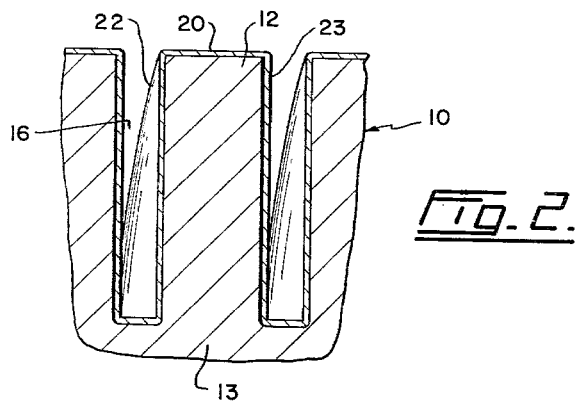
FIGURE 2 is an enlarged sectional view taken on the line 2—2 of FIGURE 1.

Referring to the drawings, 10 is an apple which has been cut to form a plurality of projections 12 radiating from a central core 13. In this example, the projections are in the form of a plurality of substantially parallel slices which are attached to core 13 and radiate therefrom. If the fruit is an apple, as preferred, projections or slices 12 are usually relatively thick in order to be self-supporting. However, it is advisable to form these slices by a spiral groove 16 so that in effect the slices are spirally connected so that each slice supports the other. The groove or grooves forming slices or projections 12 can be formed by means of a suitable cutter which does not reach completely into the centre of the fruit so that core 13 is left intact during the cutting operation. It is preferable to insert a handle 18 into the fruit, and it is usual to insert it into one end of core 13, as shown. However, the handle may be inserted into the core centrally of the length thereof so as to project laterally from the apple.

A desired coating 20 is applied to the exposed surface of apple 10. This is preferably done by dipping the apple in a suitable coating while the latter is in liquid form, although the coating may be sprayed on to the apple or even painted thereon. The edible product is greatly improved by having this coating covering the opposite faces indicated at 22 and 23 of slices 12 and the surface of core 13. The cutting or grooving of the apple greatly increases the exposed surface thereof so that it can carry a great deal more of the coating material than is possible with an uncut apple. This greatly changes the taste characteristics of the apple, and makes it possible to alter the overall taste as desired. Two or more coatings may be applied to the exposed fruit surface, different types of coating may be used on different portions of the apple, and/or additional edible material may be applied to the coating, such as ground nuts, coconut or the like.

When a person wishes to eat this product, pieces of the projections or slices 12 may be easily broken off with one's fingers and then eaten in the usual manner. Furthermore, if a person does not wish to break the pieces off, the spaces between the projections or slices make it comparatively easy to bite into the fruit. The fruit may be manipulated so that a projection or slice is inserted into the mouth between the teeth, making it possible to bite off a portion of said projection or slice.

As stated above, any suitable or desired edible coating material may be used. A common type of candy coating is made up of sugar, cream of tartar, vinegar and water mixed and then boiled for a predetermined time. This mixture is alowed to cool a certain amount, and then apples are dipped into it. This may be quickly done with the present product since the liquid coating instantly covers the entire exposed surface of the fruit right into the core thereof. A caramel coating may be applied. Furthermore, ground nuts, coconut or the like may be sprinkled over or otherwise applied to the surface of the fruit.

Although this invention is primarily applicable to fruit of fairly solid texture, it is to be understood that coatings may be applied to some vegetables, such as potatoes or carrots, for example, and it is to be understood that the term "fruit" is intended to cover products of this nature.

The present edible product is such that it may be quickly, easily and conveniently eaten by breaking parts thereof or by biting into it in the same manner as you would bite into an apple. The surface area of the fruit is so increased that by controlling the type and quantity of coating material used, the resulting taste can to a great extent be regulated.

What I claim as my invention is:

1. An edible product comprising an apple of a fairly solid texture, said apple being cut to form a plurality of thin projections attached to and radiating from a central core that can be bitten off said core, said core extending longitudinally of the product and maintaining the projections in spaced relationship and generally lending a degree of rigidity to said product, said thin projections being spaced from each other longitudinally of the core, and the exposed surface of the apple being covered with an edible coating.

2. An edible product as claimed in claim 1 including a handle inserted into the core and projecting outwardly therefrom to form a handle for the product.

3. An edible product comprising an apple of a fairly solid texture, said apple being cut to form a plurality of thin slices attached to and radiating from a central core, said core extending longitudinally of the product and maintaining the slices in spaced relationship and generally lending a degree of rigidity to said product, said thin slices being spaced from each other longitudinally of the core and the exposed surface of the apple being covered with an edible coating.

4. An edible product comprising an apple of a fairly solid texture, said apple being cut helically to form a plurality of thin spirally connected slices on and radiating from a central core that can be bitten off said core, said core extending longitudinally of the product, the spiral connection of the slices resulting in said slices supporting each other outwardly from the core, said core maintaining the slices in spaced relationship and generally lending a degree of rigidity to the product, and the exposed surface of the apple being covered with an edible coating.

References Cited by the Examiner

UNITED STATES PATENTS 2,489,581  11/49  Mason ----------------- 99—107
2,949,367   8/60  Goldmeier ------------ 99—138 X A. LOUIS MONACELL, *Primary Examiner.*

BEATRICE H. STRIZAK, *Examiner.*